(12) United States Patent
Peter et al.

(10) Patent No.: US 11,533,532 B2
(45) Date of Patent: Dec. 20, 2022

(54) METHOD FOR STREAMING AND REPRODUCING APPLICATIONS VIA A PARTICULAR TELECOMMUNICATIONS SYSTEM, TELECOMMUNICATIONS NETWORK FOR CARRYING OUT THE METHOD, AND USE OF A TELECOMMUNICATIONS NETWORK OF THIS TYPE

(71) Applicant: Gorillabox GmbH, Hamburg (DE)

(72) Inventors: Frederik Peter, Hamburg (DE); Sheikh Khalil, West London (GB); Remco Westermann, Düsseldorf (DE)

(*) Notice: Subject to any disclaimer, the term of this patent is extended or adjusted under 35 U.S.C. 154(b) by 0 days.

(21) Appl. No.: 16/329,927

(22) PCT Filed: Sep. 3, 2016

(86) PCT No.: PCT/EP2016/001491
§ 371 (c)(1),
(2) Date: Mar. 1, 2019

(87) PCT Pub. No.: WO2018/041324
PCT Pub. Date: Mar. 8, 2018

(65) Prior Publication Data
US 2019/0253753 A1 Aug. 15, 2019

(51) Int. Cl.
*H04N 21/442* (2011.01)
*H04N 21/63* (2011.01)
(Continued)

(52) U.S. Cl.
CPC ..... *H04N 21/4351* (2013.01); *H04L 65/1003* (2013.01); *H04L 65/4084* (2013.01);
(Continued)

(58) Field of Classification Search
None
See application file for complete search history.

(56) References Cited

U.S. PATENT DOCUMENTS

2006/0059496 A1* 3/2006 Joy ................... G06F 11/3636
719/310
2007/0266122 A1* 11/2007 Einarsson .......... H04N 21/4383
348/E5.002
(Continued)

FOREIGN PATENT DOCUMENTS

WO 2009/073830 A1 6/2009
WO 2010/141522 A1 12/2010
(Continued)

OTHER PUBLICATIONS

English Translation of the International Preliminary Report on Patentability for PCT/EP2016/001491, dated May 19, 2017 submitted herewith (10 pgs.).
(Continued)

*Primary Examiner* — Brian T Pendleton
*Assistant Examiner* — Jean D Saint Cyr
(74) *Attorney, Agent, or Firm* — Wood IP LLC

(57) ABSTRACT

The invention relates to a method for streaming and reproducing applications (apps) via a particular telecommunications system. The invention also relates to a telecommunications network. The invention further relates to the use of a telecommunications network of this type for streaming and reproducing applications (apps) via a particular telecommunications system. The invention furthermore relates to an application which makes it possible to configure the download, installation and updating of data on a terminal such that the whole application is fully executable on the terminal while downloading, installing and updating takes place on the terminal.

7 Claims, 8 Drawing Sheets

Figure 1:
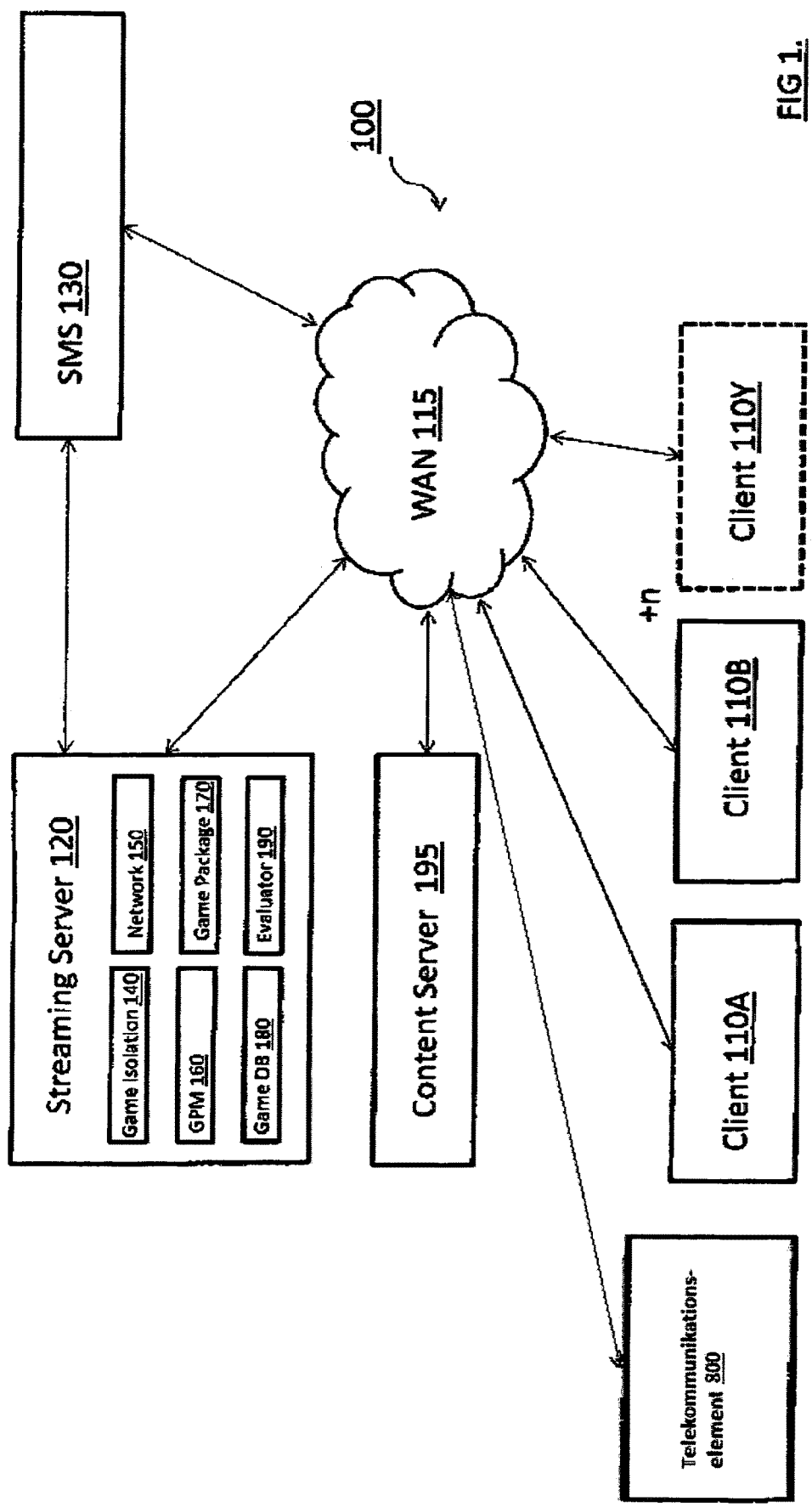

(51) Int. Cl.

| | |
|---|---|
| *H04N 21/6375* | (2011.01) |
| *H04N 21/647* | (2011.01) |
| *H04N 21/435* | (2011.01) |
| *H04L 65/612* | (2022.01) |
| *H04L 65/60* | (2022.01) |
| *H04L 67/101* | (2022.01) |
| *H04L 65/613* | (2022.01) |
| *H04L 65/80* | (2022.01) |
| *H04L 65/10* | (2022.01) |
| *H04N 21/234* | (2011.01) |
| *H04N 21/235* | (2011.01) |
| *H04N 21/2387* | (2011.01) |
| *H04N 21/438* | (2011.01) |

(52) U.S. Cl.
CPC ........ *H04L 65/4092* (2013.01); *H04L 65/602* (2013.01); *H04L 65/80* (2013.01); *H04L 67/101* (2013.01); *H04N 21/2353* (2013.01); *H04N 21/2387* (2013.01); *H04N 21/23424* (2013.01); *H04N 21/4384* (2013.01)

(56) References Cited

U.S. PATENT DOCUMENTS

| | | | |
|---|---|---|---|
| 2011/0107379 A1* | 5/2011 | Lajoie | H04L 65/1016 725/87 |
| 2014/0073428 A1 | 3/2014 | Perry et al. | |
| 2015/0018094 A1 | 1/2015 | Watari et al. | |
| 2016/0193530 A1* | 7/2016 | Parker | A63F 13/54 463/29 |
| 2016/0292810 A1* | 10/2016 | Fine | H04N 21/42653 |
| 2017/0041685 A1* | 2/2017 | Kwon | H04N 21/4751 |
| 2017/0339203 A1* | 11/2017 | Kekre | H04L 65/612 |
| 2018/0131984 A1* | 5/2018 | Gardner | H04L 65/605 |
| 2018/0131998 A1* | 5/2018 | Morris | H04N 21/4858 |
| 2018/0243651 A1* | 8/2018 | Peter | A63F 13/493 |
| 2019/0312915 A1* | 10/2019 | LaJoie | H04L 65/4076 |
| 2020/0384360 A1* | 12/2020 | van der Laan | A63F 13/25 |

FOREIGN PATENT DOCUMENTS

| | | |
|---|---|---|
| WO | 2010141522 A1 | 12/2010 |
| WO | 2012/037170 A1 | 3/2012 |
| WO | 2014/186858 A1 | 11/2014 |

OTHER PUBLICATIONS

International Search Report for PCT/EP2016/001491, dated May 19, 2017, and English Translation submitted herewith (7 pgs.).

"Cloud gaming—Wikipedia, the free encyclopedia," Jun. 24, 2015 (Jun. 24, 2015), XP055268633, 7 pages, Retrieved from the Internet <URL:https://en.wikipedia.org/w/index.php?title=Cloud_gaming &oldid=668477716> [retrieved on May 31, 2022].

* cited by examiner

METHOD FOR STREAMING AND REPRODUCING APPLICATIONS VIA A PARTICULAR TELECOMMUNICATIONS SYSTEM, TELECOMMUNICATIONS NETWORK FOR CARRYING OUT THE METHOD, AND USE OF A TELECOMMUNICATIONS NETWORK OF THIS TYPE

CROSS-REFERENCE TO RELATED APPLICATIONS

This application is a U.S. national phase application filed under 35 U.S.C. § 371 of International Application No. PCT/EP2016/001491, filed Sep. 3, 2016, designating the United States, which is hereby incorporated herein by reference in its entirety.

GENUS

The invention relates to a method for streaming and playback of applications (APPs) via a particular telecommunication system.

The invention further relates to a telecommunications network.

The invention also relates to the use of a telecommunications network of such a type for streaming and playback of applications (APPs) via a particular telecommunication system.

Furthermore, the invention relates to an application which enables downloading, installation and updating of data to a terminal to be configured in such a way that the complete application is fully executable on the terminal, while the downloading, installation and updating is carried out on the terminal.

PRIOR ART

Today we enjoy the advantage that by using increasingly complex programs we can satisfy increasingly complex requirements. However, this has the disadvantage that the programs are becoming more and more complex to program and thus are increasing in size (MB). This has an impact on the duration of a local installation.

Users often have to wait several hours until the software has been successfully installed.

The long installation time can be broken down into three areas:

Download: Very large amounts of data must often be downloaded before an installation can be performed, and depending on the local internet connection, this can often take from a few minutes to several hours. Often, the process can be skipped by acquiring the program on a physical disk. This involves some disadvantages however, particularly in online commerce. In future the digital delivery of the software via download will be more common.

Installation: Once a program is available locally, it must be appropriately installed in order to achieve an executable state. This process may differ in duration depending on the program and cannot be skipped.

Updating: After installation, the software is brought up to date. The reason for this may be, for example, new features in the software that are published after the initial application is released.

All of these steps in their entirety give rise to long waiting times until an application is ready to execute. For each of these three separate areas technologies and inventions exist to save time. However, there is no possibility of executing applications locally before downloading/installing/updating.

In addition, it is nowadays becoming more and more important to develop applications natively. However, native developments are always individually tailored to a specific platform. A major problem, however, is that ever newer and more modern platforms come onto the market and users do not use only one platform, but many different platforms.

Another problem is the underlying hardware. Specific applications are also based on specific hardware. This hardware has to meet certain requirements on the application, for example graphics load, processor capacity, memory, energy consumption. Conversely however, an application can require more computing power or graphics power than the hardware can provide to the platform. Especially in graphics-intensive applications—for example, games—this can mean that users will not be able to use them as the system is incompatible. Essentially there are three different approaches, to transferring applications to a non-native platform.

The first of these is the so-called native development (porting). The application is re-developed from the perspective of the non-native platform. Of all the three methods this is the most complex and time-consuming method, but it offers the possibility of using all functionalities of the new platform. A problem with this method, however, is that the application is subject to the background conditions of the platform. Thus, for example games with high graphics requirements cannot be ported to a mobile platform. Also, different hardware requirements within the non-native platform represent a problem, as for example not every user has the same mobile device.

In addition to this, software already exists that is designed to allow the developer to create a native development more easily. Porting takes place by using particular software in such a way that parts of the existing software are replaced, so as to achieve compatibility with the third-party system. This step is not always possible because some platform architectures are very different from each other. In such cases the support of the operator of the platform is usually lacking, and therefore native development is the most common approach.

Web apps are applications which are developed for web browser-based operation and thus can be used on almost all platforms. A WCM (Web Content Management System) is often also used in this case. However, these applications can only be accessed via an appropriate browser, which the platform has to provide. The disadvantage of this method is that not all applications can be ported with this method. A browser must be used, which does not always guarantee a native implementation of the application.

Streaming: This means that the application runs on a server and is only displayed on the non-native platform by means of a client. This technology is currently limited to specific applications, however, that are not time-critical (the keyword here is "latency").

From WO 2012/037170 A1 it is known to transfer the application code to the client in parallel with the stream, in order to be able to terminate the stream as soon as the application is ready to execute on the client, so that the application runs directly on the client, allowing savings in streaming resources. This can be of interest to consoles, for example, but where hardware specific requirements (limitations) apply it is not possible.

In WO 2009/073830 a system is described which offers the user access to a service on the basis of a "subscription fee". In this case, the customer is assigned a particular streaming server for the booked period. However, our system assigns the user an optimal streaming server, without requiring a "subscription fee".

In addition, WO 2010/141522 A1 uses a game server, via which part of the streaming communication between the client and the streaming server takes place.

Furthermore, the functionalities of the Interactive Layer are represented by the video source, which in this development is handled via a separate server, in order to give third parties access to advertising space, for example.

From the anonymous article: "Cloud gaming—Wikipedia, the free encyclopedia", 24 Jun. 2015, XP055268633, found on the internet:

URL:https://en.wikipedia.org/w/index.php?title=Cloud gaming&oldid=668477716 [accessed on 2016-04-26] section "Types", 2nd paragraph; page 1, it is known that part of the server power, namely at least five percent of the processing capacity, and of the central server must be transferred to the terminal. This requires a correspondingly large processing power in the terminal. This will therefore tend to be correspondingly expensive. The author or partner who supplies the game, must provide a code for the purpose, which allows the terminal to select exactly this processing capacity of five percent or more. This requires, at least on the part of the programmer, a correspondingly large amount of programming effort. Also the security of the system suffers from drawbacks, since not only the relevant server but also the terminals must be designed to a relatively high security standard.

From WO 2009/073830 A1 it is known to share the processing capacity over at least one central computer and to provide at least one terminal. Here, measures are taken to control the latency. This means the transit period of a signal (time interval). Improvement in quality is not only determined by the latency, but also the number of hops, the bandwidth and the IDS.

This document also describes a so-called subscription system. Here, the customer pays a fee in advance. At least a separate server is also provided, which can import advertising material for example.

From WO 2010/141522 A1 it can be inferred that game servers and video servers are not the same thing. At least two servers are therefore required, which must provide the processing capacity. Communication therefore only ever takes place on devices of the same platform, for example from PC to PC or from console to console or from mobile wireless device to mobile wireless device. In the specification it is also implied that the quality adjustment must be carried out continually, without disclosing further details of this.

In US 2015/018094 A1 and WO 2014/186858 A1 at least two servers must be provided, which communicate with the relevant terminal. It is therefore possible that at any given time data packets are transmitted from the two servers to exactly the same terminal at the same time. This can lead to errors in data transmission.

OBJECT OF THE INVENTION

The object of the invention is to create a method for streaming and playback of applications (apps), in which waiting times during downloading, installation and updating of software programs are to be minimized.

Solution

This object is achieved by a method for streaming and reproducing applications (APPs) via a particular telecommunications system, in which one or more streaming servers, which can be connected together by telecommunication, execute the relevant application and which form a connection to the respective telecommunication terminal which is characterized by an optimal connection, taking account of the number of hops, latency, bandwidth and ISP, wherein the relevant telecommunication terminal retrieves the desired application from a streaming server with optimal connection, which provides the processing power for setting up the video stream and encoding the relevant application, for the reproduction of applications on non-native application system environments, which differ ether due to different hardware or software components, wherein the streaming server undertakes the handling of the different applications and the rendering/encoding of the application and its audio and video signals, wherein the data are transmitted to the respective telecommunication terminal—mobile wireless device, tablet, laptop, PC, TV—and the transmission is performed using a modified h.264 protocol and the WAN is used as the transmission medium for audio/video packets via UDP/TCP and the entire processing power is used by the relevant streaming server, wherein the packet-based data are decoded only at the telecommunication terminal, wherein in order to provide a platform-independent streaming technology, which is programmed once and is portable to any telecommunication terminals, in which the streaming of the individual applications, for example video games, is carried out over a WAN, in such a way that a) a communication with the session server by means of the telecommunication terminal (small applications) is carried out;

b) a specific session is implemented for a specific end-user for the streaming server of the relevant application, for example a game, which is optimally nearest to the telecommunication terminal;

c) session information is communicated to the telecommunication terminal and the streaming server by the relevant session server;

d) a direct connection is implemented between the telecommunication terminal and the streaming server of the relevant application, for example a video game;

e) when setting up a direct connection between the telecommunication terminal and the relevant streaming server, the following steps are initiated:
   i. recording the audio/video data of the running application, for example a game, via the streaming server on which the game is running;
   ii. compressing the audio/video data using high-quality run-time modified hardware encoders;
   iii. transmission of the compressed audio/video data via WAN;
   iv. receiving the audio/video data by the telecommunication terminal;
   v. decompressing the audio/video data using a modified decoder;
   vi. reproduction of the audio/video data on the telecommunication terminal (small);
   vii. recording the actions (inputs) of the user of the telecommunication terminal, for example a player, on the telecommunication terminal (small) by a Thin Layer which is placed dynamically over the display field;
   viii. efficient transmission of the inputs back to the relevant streaming server of the game and
   ix. playback of the transmitted inputs on the streaming server, wherein in the event of packet loss during the transmission of files to the telecommunication terminal, for example from a streaming server to the telecommunication terminal, making use of a plurality of specially developed error correction procedures, the following steps are carried out:

a) recovery strategy is invoked on telecommunication terminal (small) in order to maintain a smooth gaming experience;

b) the appropriate recovery strategy is selected, and c) the recovery request is sent back to the relevant streaming server of the application, for example the game, this process can also be initialized by the streaming server, wherein the applications are streamed on one or more local terminals independently of the downloading on the local terminal.

By individually selecting a local streaming server, the latency between streaming server and client is reduced to a minimum, so that a maximum possible range with the maximum possible coverage is obtained, while the method operates in a resource-saving manner and does not make the streaming server available until it is needed.

In addition, due to the standardization of the communication independently of the application, an ideal route for communication purposes between the client and the streaming server can be selected at any given time.

The method according to the invention allows, in accordance with the object to be achieved, non-natively programmed applications to be played back on non-native software environments, and specifically without meeting the hardware requirements of the third-party platforms, for example in terms of processing power and graphics performance, and without satisfying the software-specific requirements of the non-native platforms, for example applications that only run on a specific operating system. In comparison to, for example, US 2014/0073428 A1 the invention uses a client which is specially created for this application. This client can be used on any chosen platform, to ensure an almost latency-free reproduction of an h.264 compressed stream. For transferring of frames the h.264 code is used. H.264/MPEG-4 AVC is an H. standard for high-efficiency video compression. The standard was adopted in 2003. The ITU name used is H.264. In ISO/IEC MPEG the standard goes under the title MPEG-4/AVC (Advanced Video Coding) and is the tenth part of the MPEG-4 standard (MPEG-4/Part 10, ISO/IEC 14496-10). In the method according to the invention a method for resource handling is also used, which distributes the load over separate streaming servers to save both on resources, as well as capacities/investments. This allows the system to operate at lower cost than comparable systems, such as that of WO 2012/37170 A1. Also, this offers the option to turn off streaming servers during operation, in order, for example, to perform maintenance work. It is generally known that in almost all cases, such as for example in WO 2010/141522 A1, a so-called hook must always be initiated in the code of the application in order to enable the streaming server to stream the application. The consequence of this is that the application code must be modified, which on the one hand can lead to extra effort, but on the other hand, can cause major problems with the original developer of the application. The method according to the invention makes a hook redundant and enables the method to be automated.

The client application essentially consists of three parts (decode thread, render thread and the interactive layer) and is stored securely in the clientnetwork.so (shared library). These parts are divided into individual modules.

The Client Session Manager module is responsible for the management (starting/ending the session) and is used for the administration of the session started by the user. This module also enables settings to be made with respect to the latency optimization.

The network module handles the network communication and manages the communication with the streaming server.

The controller module intercepts the user input to the application and communicates it to the Game Streaming Server.

The decoder-render audio module consists of two parts: the decoder module handles the decoding of the h.264 stream. The audio player plays out the sound.

The evaluator module transfers a report to the streaming server.

The recovery module performs the handling of the strategies for corrupt frames.

The Client UI module is incorporated into the interactive layer and is responsible for the UI of the application.

The interactive layer allows an additional visual representation of information to be displayed on the underlying render thread, for example to display Community Feature/Help information or advertising. It is located above the render thread and can be individually modified by the user.

For the interactive layer a predefined user interface is provided for each platform. The user can, however, using so-called layer scripting, create the corresponding user interface him/herself under certain conditions. Layer scripting provides the user with a specially developed scripting environment, which enables certain functionalities to be bound to predefined buttons. Thus the user can customize their UI to their individual needs.

The Streaming Server consists of essentially three modules (network thread, GPU thread and session handler) and is securely stored in the servernetwork.dll (shared library). Each running application on the streaming server is assigned a GPU and a network thread. This automatic process is managed by the session handler.

The network thread is responsible for the delivery of the encoded audio and video file.

The GPU thread is responsible for the hardware encoding of the audio and video frames of the application, handles the packet buffering via UDP, TCP and performs the timestamping and compression.

The session handler is responsible for starting/stopping and managing the GPU & network threads. It coordinates resources available on the game streaming server and communicates with the session management server. The idea behind the session handler is an automatic management of the resources, in order to be able to save costs.

The session management server consists of four modules: Authentication module; network module; session manager module; evaluator module.

The authentication of the client is handled by the access server, firstly to store the client specifications for the streaming server, in order to verify that the client is entitled to retrieve the requested application. The authentication can also work against a third-party system, so that third-party systems can also be connected.

The network module is responsible for the load balancing, quality assurance and administration. Load balancing is defined as the uniform distribution of the load within the network. In the area of quality assurance each individual stream is monitored and optimized in a performance-dependent manner (for example by a specific routing). The administration is designed to allow the administrator to review the current load and the routing in order to set up particular configurations.

The session manager module is responsible for the load optimization and control of the game streaming server. This unit links incoming client requests to a free space on a game streaming server and then establishes a direct connection between the client and the streaming server. The essential criteria for a link are: latency between streaming server and application client and available resources. The objective with this unit is to establish a resource-conserving procedure, in order to shut down unused capacity.

Evaluator module. This takes care of generating the statistics and administration.

The content server performs the export of advertising on the interactive layer of the corresponding client to the appropriate game. Advertising can be displayed in multiple forms. Either a permanent placement within the application takes place or specific points in time are predefined, which as soon as they are released, set a corresponding trigger to export advertising.

UDP (User Datagram Protocol) is simple, less complex and more efficient for real-time data transfers. The problem with UDP however, is that there is no mechanism for handling data packets that have been lost in the network. Therefore, display errors, stuttering and flickering occur when the game is played in the cloud.

An intelligent method is used to correct a packet loss situation.

Blocking: Strategy on the user side in which a still image is shown while the error correction takes place. This will allow the user a better user experience compared to display errors, stuttering and flickering. Therefore, this method will ensure that in the event of packet loss the image does not contain errors.

Not blocking: Strategy on the user side in which no still image is generated while a transmission of the lost packets is requested from the server. This retransmission is not comparable with the TCP transmission, since it is under our own control and we only efficiently request it if it is needed.

Internal updating: this strategy is implemented on the user side, it talks to the video encoder (on the server side) at run-time. In the event of loss of a packet, it prompts the encoder to perform an image update. Within milliseconds of the image being interrupted due to a loss of image packets therefore, an image update is applied to it, which the naked eye cannot even notice.

Image verification: This strategy monitors the frame rate at which images are sent from the server side. In the case of a fluctuating frame rate, it ensures that the image packets are sent with a constant frame rate. This helps to ensure a consistent image experience.

Automating the recovery process reduces the duration of errors occurring by an order of magnitude and thus enables an almost error-free, continuously self-calibrating transmission between streaming server and client.

A particular advantage lies in the fact that the user/client does not need to first wait until the file is downloaded onto its terminal. Instead, he/it can immediately begin, for example, playing the game, while the download is taking place on his terminal in parallel.

FURTHER INVENTIVE EMBODIMENTS

Claim 2 describes a method in which the entire application is streamed on the local terminal without a time delay in parallel and almost in real time, while the relevant streamed application is downloaded, installed, continuously updated and launched locally on the local terminal and the stream is closed as soon as the files for the application have been made available in full on the local terminal, on which the application files are continuously updated.

In accordance with claim 3, the method is characterized in that an additional telecommunication element is provided, which monitors the relevant streaming process with a connection test device and a streaming client and for the installation process a download device, an installation device and an update device are provided, wherein the connection test device works as follows:

the connection test device is responsible for evaluating the connection between local client and streaming server, wherein the evaluation is carried out on the basis of four criteria: bandwidth, latency, hops, connection, wherein the terms mean:

Bandwidth: in this case a file is downloaded from the streaming server, wherein the bandwidth is measured when downloading the files;

Latency: in this case, the time taken by a signal to move from the streaming server to the client is measured;

Hops: in this case, the connection node or nodes through which a signal must be passed before it reaches the client is/are measured;

Connection: the relevant connection in this case is in relation to the packet loss, where the packet loss in optical transport media is lower than in copper cables;

wherein the threshold values are individually configured and tailored to the requirements of the application, wherein in the event that the connection is not adequate, the streaming client will not be launched, and the game or similar program is only loaded/installed/updated when the connection satisfies the predefined values;

and that in the event that the connection test is successful, the streaming client is launched and the connection to the streaming server is set up and the latter streams the others directly to the local client, wherein the streaming client is active until the application is installed and fully executable on the terminal, wherein the sequence between the streaming server and the client takes place as follows: when setting up a direct connection, the following steps are initiated between the client and the relevant streaming server:

i. recording the audio/video data of the running application, for example a game, via the streaming server on which the game is running.

ii. compressing the audio/video data using high-quality hardware encoders;

iii. transmission of the compressed audio/video data via WAN;

iv. receiving the audio/video data by the telecommunication terminal;

v. decompressing the audio/video data vi. reproduction of the audio/video data on the telecommunication terminal (small);

vii. recording the actions (inputs) of the user of the telecommunication terminal, for example a player, on the telecommunication terminal (small);

viii. efficient transmission of the inputs back to the relevant streaming server of the game and ix. playback of the transmitted inputs on the streaming server.

Claim 4 describes the solution to the object relating to a telecommunications network according to the invention and comprises the following features: telecommunications network for streaming and reproducing applications (APPs) via a particular telecommunications system, in which one or more streaming servers, which can be connected together by telecommunication, execute the relevant application and which form a connection to the respective telecommunication terminal which is characterized by an optimal connection, taking account of the number of hops, latency, bandwidth and ISP, wherein the relevant telecommunication terminal retrieves the desired application from a streaming server with optimal connection, which provides the processing power for setting up the video stream and the encoding of the relevant application, for the reproduction of applications on non-native application system environments which differ ether due to different hardware or software components, wherein the streaming server undertakes the handling of the different applications and the rendering/encoding of the application and its audio and video signals, wherein the data are transmitted to the respective telecommunication terminal—mobile wireless device, tablet, laptop, PC, TV—and the transmission is performed using a modified h.264 protocol and the WAN is used as the transmission medium for audio/video packets via UDP/TCP and the entire processing capacity is used by the relevant streaming server, wherein the packet-based data are decoded only at the telecommunication terminal, wherein in order to provide a platform-independent streaming technology, which is programmed once and is portable to any telecommunication terminals, in which the streaming of the individual applications, for example video games, is carried out over a WAN, in such a way that a) a communication with the session server by means of the telecommunication terminal (small applications) is carried out;

b) a specific session is implemented for a specific end-user for the streaming server of the relevant application, for example a game, which is optimally nearest to the telecommunication terminal;

c) session information is communicated to the telecommunication terminal and the streaming server by the relevant session server;

d) a direct connection is implemented between the telecommunication terminal and the streaming server of the relevant application, for example a video game;

e) when setting up a direct connection between the telecommunication terminal and the relevant streaming server, the following steps are initiated:
   i. recording the audio/video data of the running application, for example a game, via the streaming server on which the game is running;
   ii. compressing the audio/video data using high-quality run-time modified hardware encoders;
   iii. transmission of the compressed audio/video data via WAN;
   iv. receiving the audio/video data by the telecommunication terminal;
   v. decompressing the audio/video data using a modified decoder;
   vi. reproduction of the audio/video data on the telecommunication terminal (small);
   vii. recording the actions (inputs) of the user of the telecommunication terminal, for example a player, on the telecommunication terminal (small) by a Thin Layer which is placed dynamically over the display field;
   viii. efficient transmission of the inputs back to the relevant streaming server of the game and
   ix. playback of the transmitted inputs on the streaming server, wherein via a particular telecommunications system in which one or more streaming servers, which can be connected together by telecommunication, execute the relevant application and which form a connection to the respective telecommunication terminal which is characterized by an optimal connection, taking account of the number of hops, latency, bandwidth and ISP, wherein the relevant telecommunication terminal retrieves the desired application from a streaming server with optimal connection, which provides the processing power for rendering and encoding of the relevant application, for the reproduction of applications on non-native application system environments which differ ether due to different hardware or software components, wherein the streaming server undertakes the handling of the different applications and the rendering/encoding of the application and its audio and video signals of the individual images (frames), wherein the data are transmitted to the respective telecommunication terminal—mobile wireless device, tablet, laptop, PC, TV—and the transmission is performed using a modified h.264 protocol and the WAN is used as the transmission medium for audio/video packets via UDP/TCP and the entire processing capacity is used by the relevant streaming server, wherein the packet-based data are decoded only at the telecommunication terminal, wherein the playback of applications is streamed on a local terminal independently of the downloading on the local terminal.

The telecommunications network according to claim 5 is characterized in that the telecommunications network is assigned at least one additional telecommunications element, which comprises a streaming process with a connection tester and at least one streaming client for the installation of the files and an element for downloading, installing and updating is provided for the application.

A particularly advantageous embodiment of the invention is described in claim 6, wherein the entire application is streamed directly on the local terminal without a time delay, while the application actually being streamed is downloaded, installed, updated and launched locally on the local terminal and the stream is closed as soon as the files for the application have been made available in full on the local terminal.

Claim 7 describes the use of a telecommunications network for providing a platform-independent streaming technology, which is programmed once and is portable to any telecommunication terminals, in which the individual applications, for example video games, are streamed over a WAN, in such a way that a) a communication with the session server by means of the telecommunication terminal (small applications) is carried out;

b) a specific session is implemented for a specific end-user for the streaming server of the relevant application, for example a game, which is optimally nearest to the telecommunication terminal;

c) session information is communicated to the telecommunication terminal and the streaming server by the relevant session server;

d) a direct connection is implemented between the telecommunication terminal and the streaming server of the relevant application, for example a video game;

e) when setting up a direct connection between the telecommunication terminal and the relevant streaming server, the following steps are initiated:
   i. recording the audio/video data of the running application, for example a game, via the streaming server on which the game is running;

ii. compressing the audio/video data using high-quality run-time modified hardware encoders;
iii. transmission of the compressed audio/video data via WAN;
iv. receiving the audio/video data by the telecommunication terminal;
v. decompressing the audio/video data using a modified decoder;
vi. reproduction of the audio/video data on the telecommunication terminal (small);
vii. recording the actions (inputs) of the user of the telecommunication terminal, for example a player, on the telecommunication terminal (small) by a Thin Layer which is placed dynamically over the display field;
viii. efficient transmission of the inputs back to the relevant streaming server of the game and
ix. playback of the transmitted inputs on the streaming server, wherein in the event of packet loss during the transmission of data to the telecommunication terminal, for example from a streaming server to the telecommunication terminal, making use of a plurality of specially developed error correction procedures, the following steps are carried out:
a) recovery strategies are invoked in order to maintain a smooth gaming experience;
b) the appropriate recovery strategy is selected, and
c) the recovery request is sent back to the relevant streaming server [120] of the application, for example the game,
this process can also be initialized from the streaming server, wherein the telecommunications network is assigned at least one additional telecommunications link, preferably for each client, which comprises a streaming process with a connection tester and at least one streaming client for the installation of the files and an element for downloading, installing and updating is provided for the application.

In accordance with claim 8 the source code—for the communication with a client (user, terminal)—is as follows:

```
/***************************AddPortAsynchronisation.java****************************************
*********************************************************************************************/
package org.cloundgaming4u.client.portforwarding;
import java.io.IOException;
import net.sbbi.upnp.messages.UPNPResponseException;
import android.content.Context;
import android.os.AsyncTask;
import android.util.Log;
public class AddPortAsync extends AsyncTask<Void, Void, Void> {
private Context context;
private UPnPPortMapper uPnPPortMapper;
private String externalIP;
private String internalIP;
private int externalPort;
private int internalPort;
public AddPortAsync(Context context, UPnPPortMapper uPnPPortMapper, String externalIP, String
internalIP,
int externalPort, int internalPort) {
this. context = context;
this. uPnPPortMapper = uPnPPortMapper;
this. externalIP = externalIP;
this. internalIP = internalIP;
this. externalPort = externalPort;
this. internalPort = internalPort;
}
@Override
protected void onPreExecute( ) {
super. onPreExecute( );
if(uPnPPortMapper == null)
uPnPPortMapper = new UPnPPortMapper( );
}
@Override
protected Void doInBackground(Void... params) {
if(uPnPPortMapper != null)
{
try
{
Log. d("cg4u_log", "Contacting Router for setting network configurations");
if(uPnPPortMapper.openRouterPort(externalIP,
externalPor internalIP, internalPort, "CG4UGames"))
{
Log.d("cg4u_log",String.format("Setting network configurations successful IP:%s
Port:%d",externalIP,externalPort));
Log.d("cg4u_log",String.format("Setting network configurations successful IP:%s Port:%d",internalIP,
internalPort));
}
}
catch (IOException e)
{
e.printStackTrace( );
}
catch (UPNPResponseException e)
{
e.printStackTrace( );
}
}
```

```
return null;
}
@Override
protected void onPostExecute(Void result) {
super.onPostExecute(result);
//Send broadcast for update in the main activity
//Intent i = new Intent(ApplicationConstants.APPLICATION_ENCODING_TEXT);
//context.sendBroadcast(i);
}
}
/*************************** UniversalPortMapper.java********************************
**********************************************************************************/
package org.cloundgaming4u.client.portforwarding;
import net.sbbi.upnp.impls.InternetGatewayDevice;
import net.sbbi.upnp.messages. UPNPResponseException;
import java.io. IOException;
public class UPnPPortMapper {
private InternetGatewayDevice[ ] internetGatewayDevices;
private InternetGateway Device foundGatewayDevice;
/**
 * Search for IGD External Address
 * @return String
 */
public String findExternalIPAddress ( ) throws IOException, UPNPResponseException
{
/** Upnp devices router
search*/
if(internetGatewayDevices == null)
{
internetGatewayDevices =
InternetGatewayDevice.getDevices(ApplicationConstants.SCAN_TIMEOUT);
}
if(internetGatewayDevices != null)
{
for (InternetGatewayDevice IGD : internetGatewayDevices)
{
foundGatewayDevice = IGD;
return IGD.getExternalIPAddress( ).toString( );
}
}
return null;
}
/**
 * Search Found Internet Gateway Device Friendly Name
 * @ return
 */
public String findRouterName( ){
if(foundGatewayDevice != null){
return foundGatewayDevice. getIGDRootDevice( ).getFriendlyName( ).toString( );
}
return "null";
}
/**
 * Open Router Port
 * IGD == Internet Gateway Device
 *
 * @param internalIP
 * @param internalPort
 * @param externalRouterIP
 * @param externalRouterPort
 * @param description
 * @ return
 * @throws IOException
 * @throws UPNPResponseException
 */
public boolean openRouterPort(String externalRouterIP, int externalRouterPort, String internalIPjnt
internalPort,
String description)
throws IOException, UPNPResponseException {
/** Upnp devices router
search*/
if(internetGatewayDevices == null){
internetGatewayDevices =
InternetGatewayDevice.getDevices(ApplicationConstants.SCAN_TIMEOUT);
}
if(internetGatewayDevices != null){
for (InternetGatewayDevice addIGD : internetGatewayDevices) {
/** Open port for TCP protocol and also for UDP protocol
 * Both protocols must be open this
```

```
is a MUST*/
//addIGD.addPortMapping(description, externalRouterIP, internalPort,
externalRouterPort, internalIP, 0, ApplicationConstants.TCP_PROTOCOL);
addIGD.addPortMapping(description, externalRouterIP, internalPort, externalRouterPort, internalIP,
0, ApplicationConstants.UDP_PROTOCOL);
}
return true;
}else{
return false;
}
}
public boolean removePort(String externalIP,int port) throws IOException,
UPNPResponseException{
/** Upnp devices router
search*/
if(internetGatewayDevices == null){
internetGatewayDevices = InternetGatewayDevice.getDevices(5000);
}
/**Remote port mapping for all routers*/
if(internetGatewayDevices != null){
for (InternetGatewayDevice removeIGD : internetGatewayDevices) { // removeIGD.
deletePortMapping(externalIP, port,
ApplicationConstants.TCP_PROTOCOL);
removeIGD.deletePortMapping(externalIP, port, "UDP");
}
return true;
}else{
return false;
}
}
}
************************************************
End of ClientNetworkCommunication
******************************
```

Figure 2:
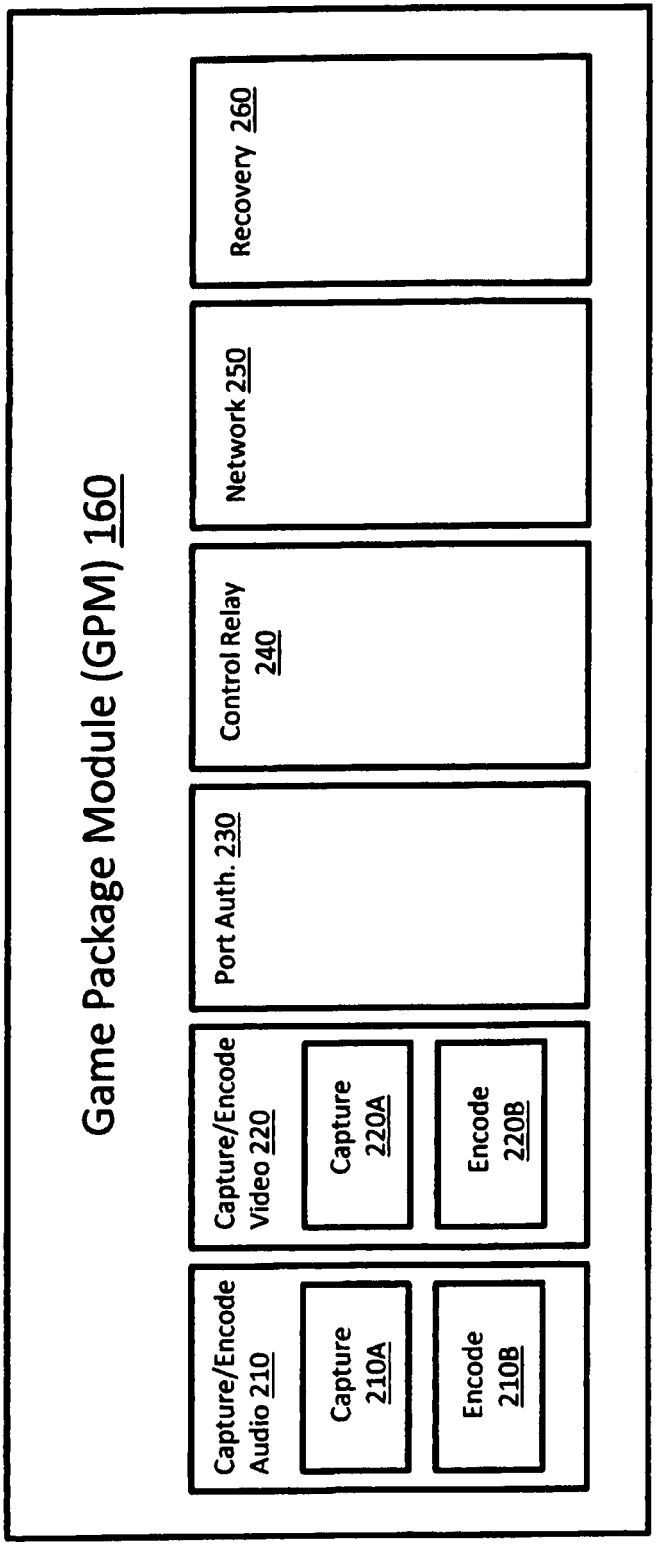
Figure 3:
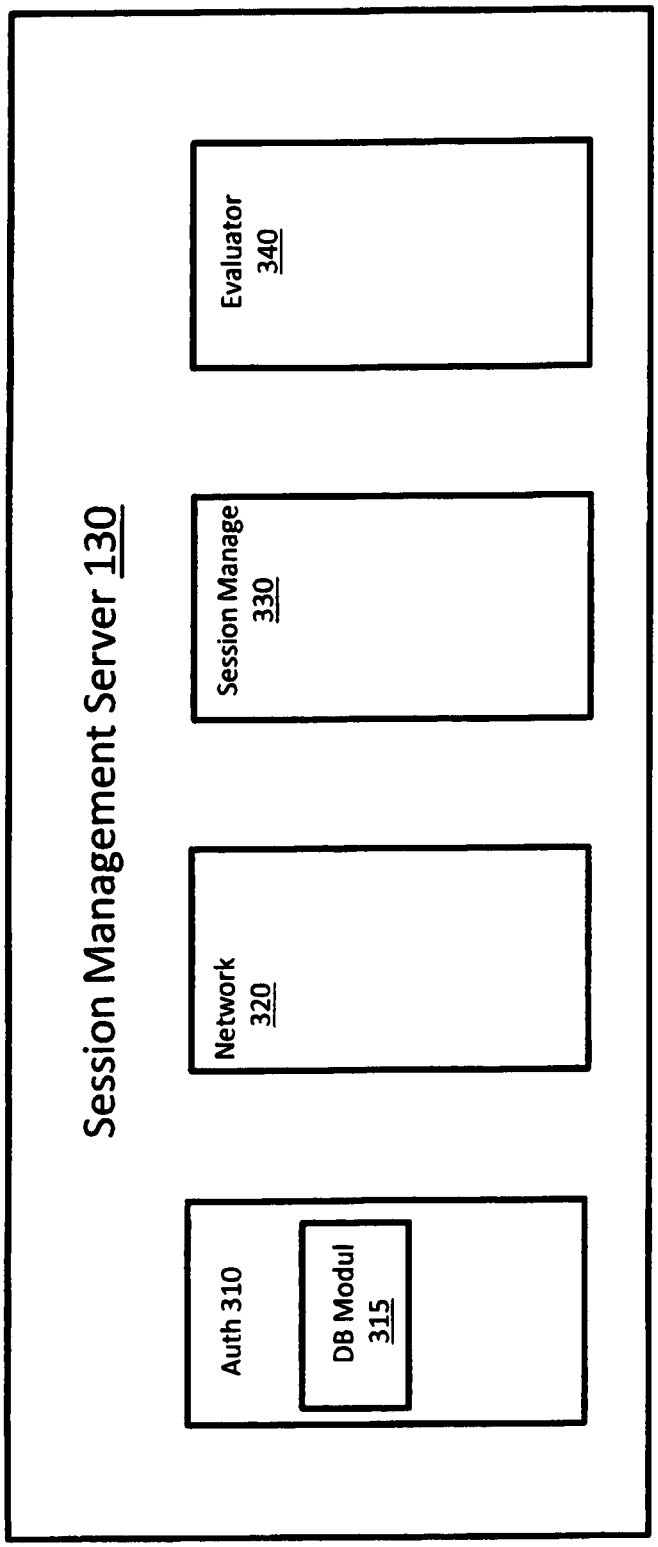
Figure 4:
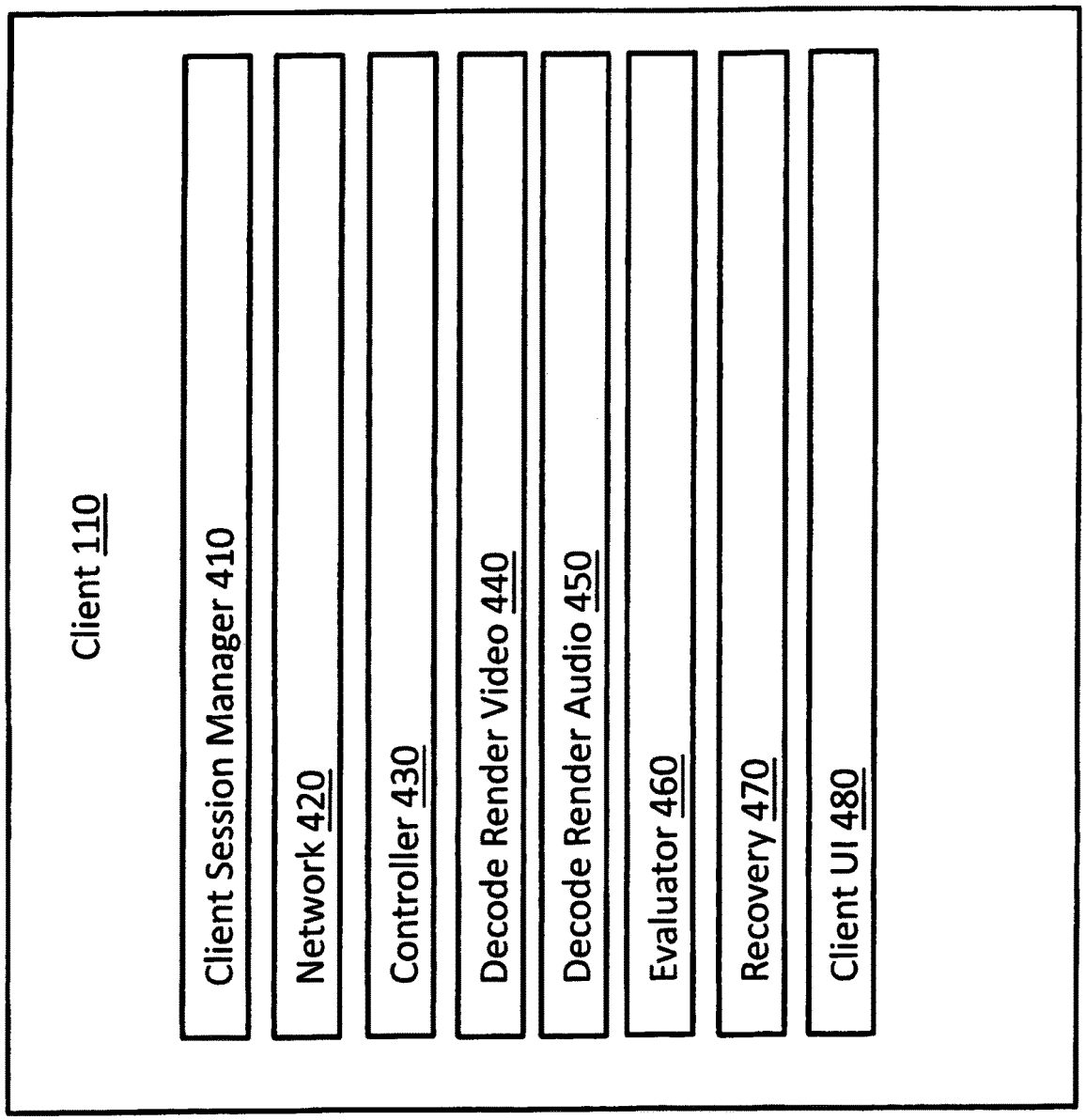
Figure 5:
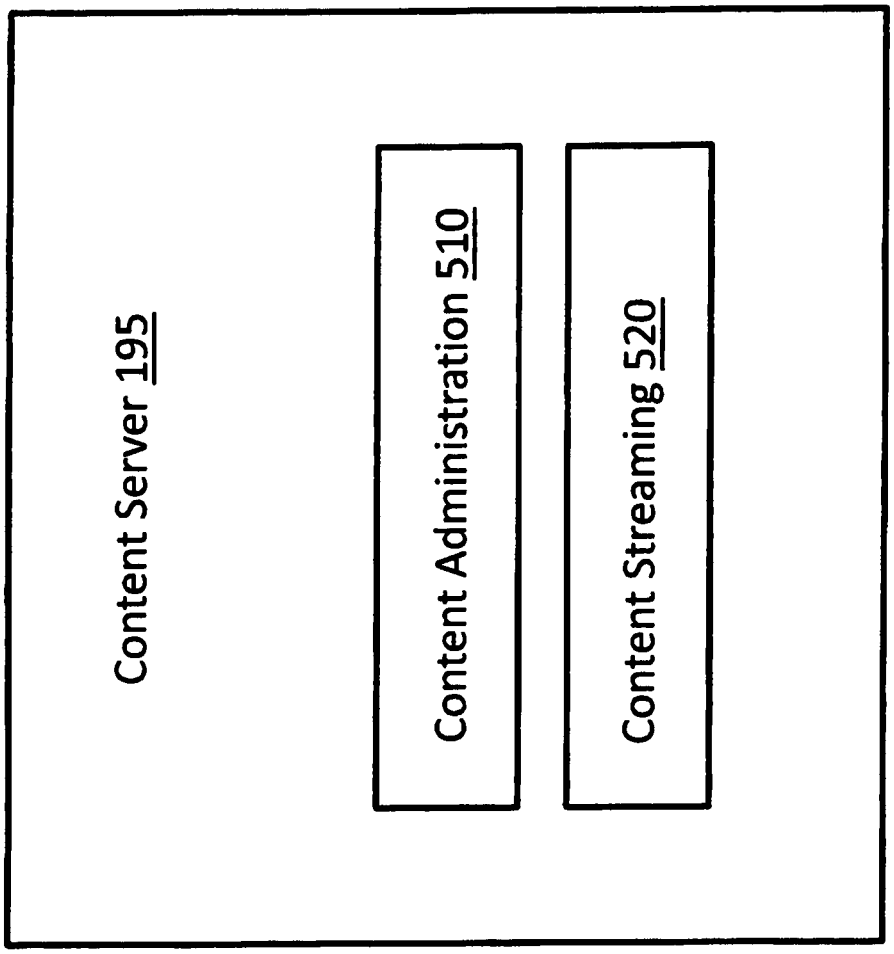
Figure 6:
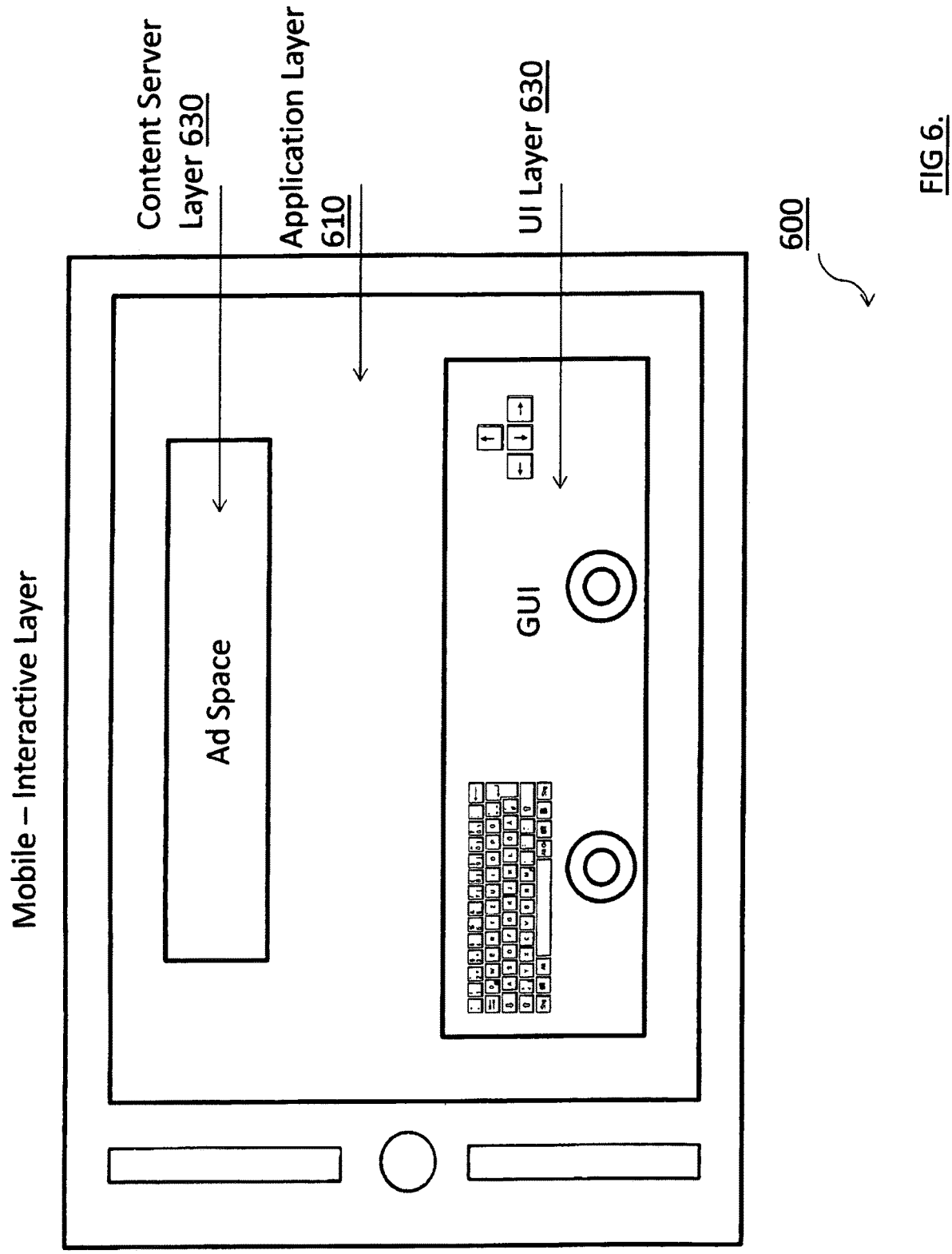
Figure 7:
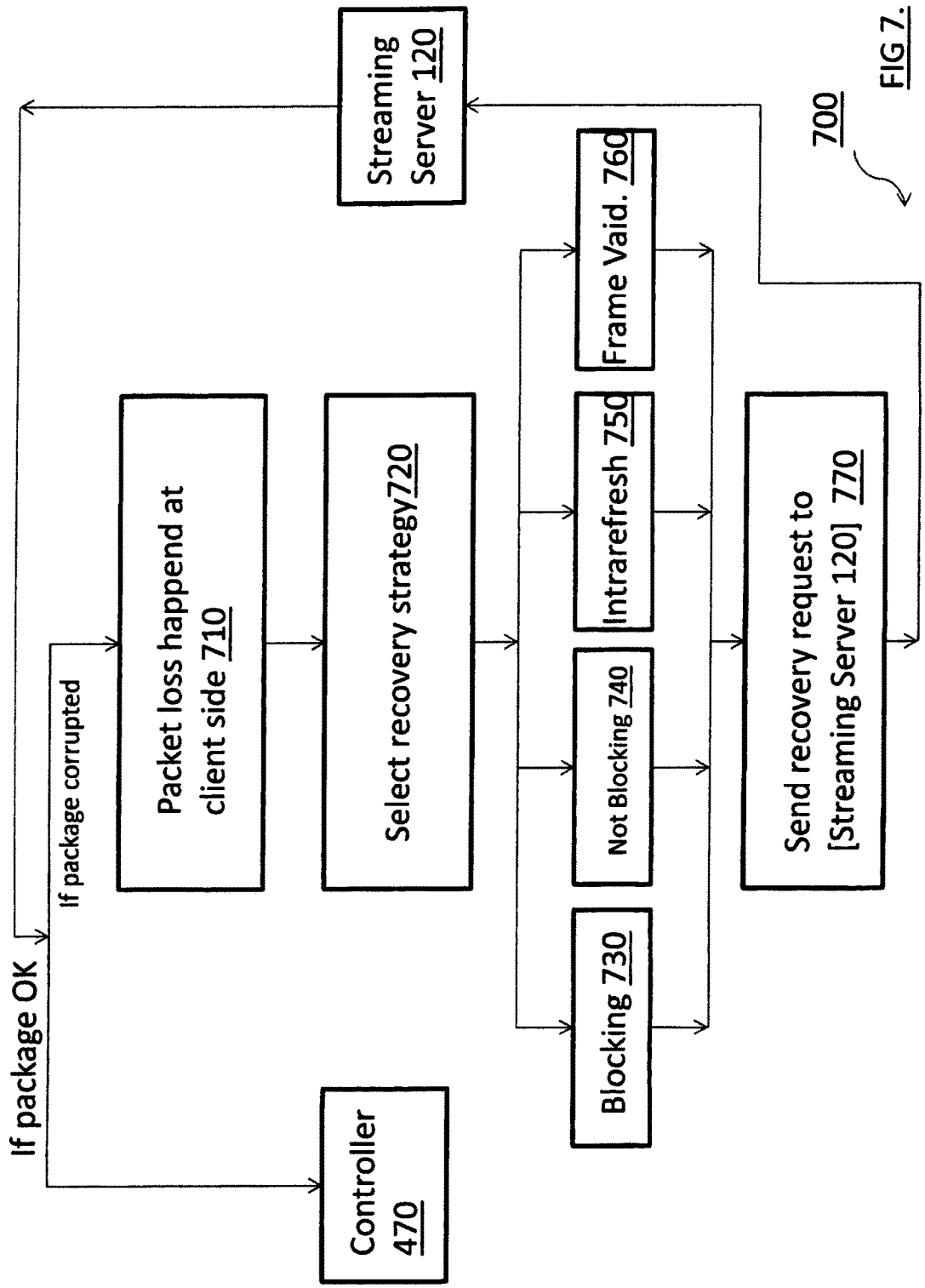

In the drawings, examples of the invention are illustrated—schematically in some cases. Shown are:

FIG. 1 a block diagram with a schematic representation of the relationships between the different areas and the streaming server;

FIG. 2 a block diagram of the game package module;

FIG. 3 a block diagram of the session management server;

FIG. 4 a block diagram of the Mobile—Interactive Layer for the client;

FIG. 5 a block diagram with a flow chart of the recovery module of the client;

FIG. 6 Mobile Interactive Layer—exemplary illustration of the interface of a mobile terminal;

FIG. 7 Recovery Strategy Process in the event of loss of a data packet and

Figure 8:
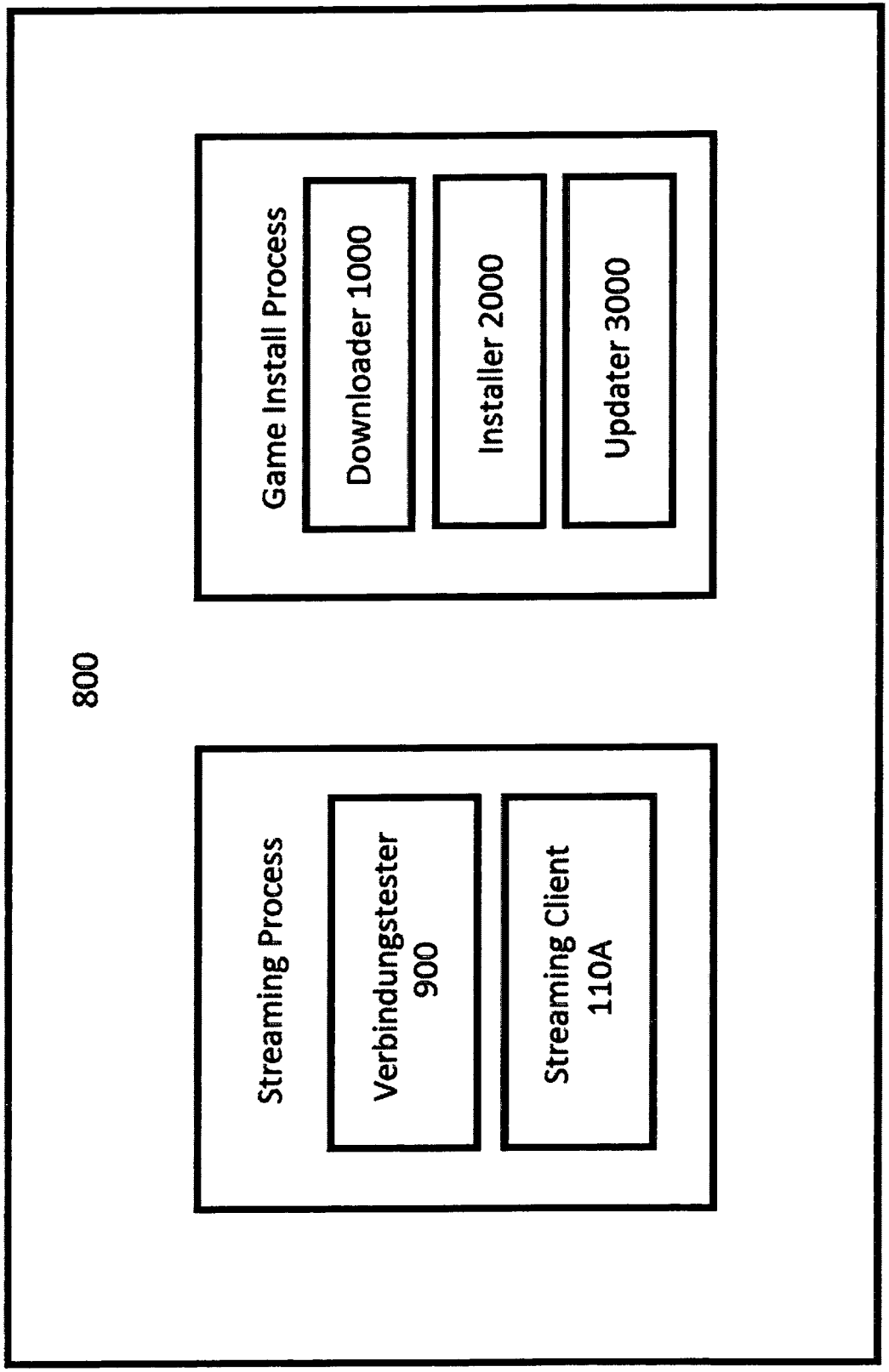

FIG. 8 an overview of the telecommunication element.

FIG. 1 shows the individual elements that are necessary in the communication. Thus the streaming server 120 handles the initialization of the application and launches it in a virtual environment. For this purpose, the streaming server 120 has a Game Isolation Module 140. In this an application-friendly environment is launched which, on the one hand, guarantees the ability to execute the application, but is also responsible for the reproduction of the control signals from the client 110A. The streaming server can launch any number of instances of the same or different applications. The limiting factor in this relationship is the computing power of the GPU in graphics applications. Each application that is launched is assigned a game DB 180. This Game DB 180 is responsible for storing relevant data for the application. In order to launch an application, however, this must first be available to the game package manager 180 as a game package 170. The network module 150 of the streaming server 120 then handles the encoding and packaging of the frames. A further task of the network module 150 is the handling of recovery requests of the client 110A. To perform administrative interventions and evaluations, the Evaluator Module 190 has been developed. This module is responsible for the generation of statistics.

The client, as a thin client, is used for the transmission of audio/video signals and can typically be deployed on any platform. A streaming server 120 can be in a relationship of 1:n, however, a client can only receive the communication to a particular streaming server 120. Typically, the number of clients per streaming server is not limited by the software but by the corresponding hardware capacities of the GPU of the streaming server 120.

Communication between the streaming server 120 and the client 110A is always initially established via the session management server 130. This performs the initial request of the client 110A to connect to the streaming server and searches for the optimal streaming server 120 for the client 110A. One system can have multiple streaming servers operating in parallel. They also do not always need to be in the same data center or country. After the assignment of a streaming server 120 by the session management server 130 for the client 110A, the streaming server 120 handles the direct communication with the client 110A.

A further element is the content server 195. This server is responsible for the delivery of certain parts in the interactive layer of the client 110A. Among other things, this controls the display of advertising according to the application that is displayed on the thin client. The necessary information is provided to the content server 195 via the session management server 30.

The communication takes place primarily via the Wide Area Network (WAN) 115. This includes various modes of transmission and is not limited to certain sections.

FIG. 2 shows the game package Module 160, which is part of the streaming server 120. The game package module 160 is started initially for each new application and handles six sub-areas for the application. Capture Encode Audio 210 is divided into the sections Capture 210A and Encode 210B, and responsible for sampling the audio signal. The Capture Encode Video section 220 is divided into the same sections as the audio module 210.

The Port Authentication Module 230 handles the port authentication and corresponds to the provision of the connection between game stream server 120 and the client 110A. The Control Relay 240 is responsible for XXX. The task of the network relay 250 is to send off the corresponding packages and to manage incoming packets. The recovery module 260 is responsible for answering the corresponding recovery requests of the client 110A.

FIG. 3 deals with the session management server 130. This has the task of authentication 310 and using a downstream DB module 315, its task is to save or store the data used for authentication. This DB module 315 is only optional, however. The option of an external authentication remains unaffected. The network section 320 is responsible for the communication between the WAN 115, streaming server 120, content server 195 and the corresponding clients. The session manager 330 is then authoritatively responsible for managing the individual sessions and handles the assignment of the clients to a corresponding streaming server. The Evaluator module has a direct connection to the individual clients and gathers relevant data for a subsequent central evaluation.

FIG. 4 shows the individual elements of the client. The entire client 110 has been specially developed for the application and does not require separate software. It consists of eight sections to be described as follows.

Client Session Manager 410, communicates with the streaming server 120 and the session management server and is initially responsible for the authentication and management of the client.

Network module 420 is responsible for configuring and maintaining the connection. This module also handles the sending and receiving of various packets.

The Controller 430 handles the dispatch of the delivered frames and audio packets as a visual image in the client.

Decode Render Video 440 and Decode Render Audio 450 receive the packets that were previously received from the network module 420 and were forwarded by the controller 430.

The elevator module 460 is responsible for collecting statistical data and transmits this to the session management server. Accordingly, the session management server can also optimize the connection. This results in a feedback, which makes this module very important.

The recovery module 470 evaluates incoming data packets. If a data packet turns out to have errors, the module selects a recovery strategy and, if necessary, requests a new packet from the streaming server or takes other measures to compensate for the loss, without suffering a loss in terms of latency or quality.

The client UI includes the interactive layer and content of the content server 195. This is where the input of the user is captured and sent off to the streaming server 120.

FIG. 5 shows the structure of the content server. This is responsible for the content administration 510 and content streaming 520.

The Content Administration is used for presetting e.g. the advertising to be displayed within the interactive layer in the client 110. The Content Administration 510 is designed to specify both the frequency as well as the content.

The Content Streaming module 520 handles the playback of the content and is used as a central interface for all clients.

FIG. 6 shows the interactive layer 600, which is part of the client UI 480. In principle, between three different sections can be differentiated.

The application layer 610 reproduces the received frames and is responsible for the visual representation of the application.

On top of the application layer 610 is located the UI layer 620. This layer can be configured individually, but in principle, it is definitively responsible for the input by the user in the client.

In addition to the above-mentioned layers, there is the option to import content from the content server 195. This takes place in the area of the Content Layer 630.

FIG. 7 shows the sequence of the recovery strategy of the client 110 in the module 470. As soon as a "package loss" has been detected 710 on the part of the client, the recovery module will select an corresponding solution on the basis of fixed criteria 720.

Once the decision is made, whether Blocking 730, Not Blocking 740, Intrarefresh 750 or Frame Validation 760 has been selected, the recovery request 770 is sent to the streaming server 120. The streaming server accordingly sends a new packet and the task of the recovery module 470 has been completed.

FIG. 8 shows the telecommunications element 800 and its functions schematically. Each client can be assigned such a connection element, which for reasons of clarity is not shown in the drawing. Each telecommunications element 800 is therefore in a position to perform a streaming process and a gaming install process.

During the streaming process, a connecting device 900 designed as a connection tester first tests the software to be loaded of the application for the relevant streaming client, for example 110A, while at the same time, in parallel with this, in our case a game is in progress via a gaming install-process. It can also, of course, be a different application. A download device designed as a downloader 1000 downloads the software onto the terminal device, while an installation device 2000 designed as an installer performs the installation at the same time, and an updating device designed as an updater 3000 always ensures that the latest data is available, thus performs a constant update process.

The device apparent from FIG. 8 which is designed as a telecommunications element 800 therefore enables the display of applications before the actual download of data, its installation and updating takes place. The telecommunications element 800 therefore allows, so to speak, a small application (Thin Client) on the terminal. This launches the appropriate processes and enables the streaming of the application while the application is installed.

The telecommunications element 800 thus allows two separate processes, namely the streaming process and the user install process, for example a gaming install process.

The streaming process in the telecommunications element 800 consists of two modules:

Connection tester: responsible for the testing of the connection on the basis of three criteria: Latency, bandwidth and network. In case the connection does not meet the requirements, the streaming client is not started. The threshold values for the three criteria can be flexibly adjusted and tailored to the application.

Streaming client: If the connection tester proves successful, then the streaming client will be started.

By using the streaming technology this streams the application directly into a local window of the terminal, for example into the PC window of a player.

During installation this process handles a plurality of tasks and processes them sequentially. This process is responsible for putting the application locally into an executable state, while it is being streamed. All steps are performed in the background of the system and do not require any input by the player. The streaming process performs the following steps:

Download: The application is downloaded onto the local computer in parallel with the stream.

Installation: The process installs the application in the background. Any required third-party software is also installed.

Updating: The application is updated.

Once these steps are completed, the user can run the application locally after restarting the telecommunications element 800.

The features of the invention disclosed in the description, the claims and those which are apparent from the drawings can be essential to the implementation of the invention both individually and in any desired combinations.

Explanation of Terms

| | |
|---|---|
| Application Layer | Anwendungsebene |
| Applications-Code | Anwendungscode |
| buffering | Pufferung |
| Client | Ein Client (deutsch "Kunde", auch clientseitige Anwendung oder Clientanwendung) bezeichnet A client (German "Kunde", also client-side application or client application) refers to a computer program, which is executed on a terminal of a network and communicates with a central server. |
| Client UI Module | Client Benutzeroberfläche Modul |
| Client-Application | Client-Anwendung |
| Client-Session | Client-Sitzung |
| Cloud | Complex of multiple servers in the Internet |
| codec | coder-decoder |
| Content Layers | Inhaltsebene |
| Content Servers | Inhalt-Server |
| Content Streaming | Inhalt Streaming |
| Controller | Regler |
| Controller Module | Regler-Modul |
| decode thread | decoding application |
| Decoder-Render | Dekodierungs-Ausfuhrer |
| Evaluator | evaluation unit |
| Evaluator Modul | Evaluierungsmodul |
| Frame validation | Frame Überprüfer |
| interactive layer | Interaktiv-Ebene |
| Intrarefresh | internal refresh/updating |
| Loadbalancing | Lastenverteilung |
| Network Module | Netzwerk-Modul |
| Not Blocking | Nicht-Blockieren |
| Overlay | Überlagerung |
| packaging | Paketierung |
| Recovery Module | Wiederherstellungs-Modul |
| Recovery Strategies | Wiederherstellungs-Strategie |
| Render Thread | is responsible for the rendering [display] of the application. |
| Scripting | script language |
| session handler | Sitzungs-Manager |
| shared library | Geteilte Bibliotheken |
| Streaming | Streaming |
| Streaming-Server | Streaming-Server |
| Streaming-Technology | Streaming-Technologie |
| Timestamping | Describes the allocation of a piece of data to a data packet |
| UDP | User Datagram Protocol |
| UI Layer | Benutzeroberfläche-Ebene |
| WAN | Wide Area Network |
| Web-Apps | Web-Applikationen |
| Webcontent Management | Web-Inhalt Management |

LIST OF CITATIONS

WO 2009/073830 A1
WO 2010/141522 A1
WO 2012/037170 A1
US 2014/0073428 A1
WO 2009/073830 A1
WO 2010/141522 A1
US 2015/018094 A1
WO 2014/186858 A1
Anonymous: "Cloudgaming—Wikipedia, the free encyclopedia", 24. Jun. 2015 (2015-06-24), XP055268633, found on internet:
URL:https://en.wikipedia.orq/w/index.php?title=Cloudqaminq&oldid=668477716
[accessed on 2016-04-26] Section "Types", 2nd paragraph; page 1

The invention claimed is:

1. A method for streaming and reproducing an application via a telecommunications system, the method comprising:
executing the application by at least one streaming server on the at least one streaming server,
wherein the at least one streaming server being communicatively connected to a terminal via a connection, the connection being characterized by at least one parameter selected from the group consisting of a number of hops, latency, and bandwidth;
wherein the terminal is configured to retrieve the application from the at least one streaming server,
wherein the at least one streaming server is configured to provide processing power for setting up a video stream on the terminal and for encoding of the application for reproducing the application on a non-native environment for the application on the terminal;
performing, by the at least one streaming server, a transmission of the application from the at least one server to the terminal;
decoding, by the terminal, packet-based data representative of the application; recording an input to the application at the terminal in response to the packet-based data being decoded by the terminal;
transmitting, by the terminal, the input to the at least one streaming server; registering the input at the at least one streaming server, the input being configured to alter an execution of the application at the at least one streaming server;
invoking, at the terminal, a recovery process in response to packet loss having occurred during the transmission to the terminal, the recovery process including:
selecting a recovery strategy;
sending a request to the at least one streaming server to initialize the recovery strategy; and
wherein a source code associated with the method being executed by the telecommunications system includes the following modules:
a port asynchronization module including a submodule for sending a broadcast associated with an execution of the port asynchronization module; and
a universal port mapper module including a plurality of submodules, the plurality of submodules including:

a search submodule configured to search for external addresses and return one or more identifiers associated with any found external address;

a router port submodule configured to open a port associated with devices having the one or more identifiers.

2. The method of claim 1, further including streaming the application on the terminal in real time while the application is being downloaded, installed, or updated and closing the stream when files for the application are made available in full on the terminal.

3. The method of claim 1, further including monitoring a streaming of the application via an additional telecommunication test device.

4. The method of claim 3, further including evaluating a quality of the streaming based on a test parameter selected from the group consisting of bandwidth, latency, hops, and packet loss.

5. The method of claim 1, wherein the at least one streaming server is connected to the terminal via a wireless area network (WAN).

6. The method of claim 1, further including effecting the transmission from the at least one streaming server to the terminal via a modified h.264 protocol.

7. The method of claim 1, wherein the method further includes playing back the application via streaming to the terminal independently of a downloading of the application on the terminal.

\* \* \* \* \*